Nov. 21, 1933.  J. E. LAWRENCE  1,935,950

ROLLING ATTACHMENT FOR MOTOR VEHICLES

Filed June 8, 1932

Inventor
James E. Lawrence,
by Harold J. Clark.
Attorney

Patented Nov. 21, 1933

1,935,950

UNITED STATES PATENT OFFICE 1,935,950

ROLLING ATTACHMENT FOR MOTOR VEHICLES

James E. Lawrence, Beverly, Mass.

Application June 8, 1932. Serial No. 616,055

10 Claims. (Cl. 94—50)

My present invention relates to rolling attachments for motor vehicles, and more particularly to a novel and improved device for attachment to the rear wheels of a motor vehicle, such as a truck, for use in the rolling of roads and the like.

At the present time, in road maintenance work, as practiced by cities, towns, contractors and the like, there are two methods in use. For example, assuming that there is a piece of road to be patched, such as an erosion, hole, cavity, or series of the same, the said holes are filled with suitable materials and then must be compressed and smoothed in order to provide a satisfactory surface. This has been done either by hand tamping, which is very unsatisfactory in that it is impossible to obtain sufficient compression to insure retention of the material in the hole when subjected to traffic; or by rolling by one of the usual types of road rollers. This latter method is costly, as it requires the use of a road roller for any kind of maintenance work, if a satisfactory job is to be performed, these road rollers being necessarily costly to purchase and maintain, slow in travel, and in many states requiring the services of a flagmen in conjunction therewith. There are innumerable instances where the type of maintenance work being performed on roads does not warrant the use of a roller, because of the expense involved relative to the volume of work being done.

An important object of the present invention, therefore, resides in the provision of a device which may be readily applied to the rear wheels of the usual motor trucks used in such maintenance work, and which requires no change or alteration in the truck or wheel structure.

Another object of the invention resides in the provision of a rolling device that is simple and economical to manufacture, rugged, serviceable and long-lived.

Another object of the invention resides in the provision of a device of this nature that will perform the operations of rolling, compressing and smoothing a road surface even more satisfactorily than the usual roller, because of the increased weight which may be brought to bear on the rolling attachment, and the more efficient distribution of such weight. This distribution of weight may be controlled in a large degree by the operator of the truck, who may shift the load carried by the truck to increase or decrease the compression on the road roller attachment at will.

My novel device may be left in attached position, if desired, in traveling from one job to another, or may be removed in a short time and replaced as desired.

In fine, therefore, my novel attachment, costing but a small amount, performs maintenance work superior to rollers which cost many thousands of dollars and which, because of the cost and other disadvantages, are frequently not used in such maintenance work, resulting in unsatisfactory road surface conditions due to reliance upon manual labor to tamp, compress and smooth said surface.

Other objects and features of the present invention reside in the particular construction and arrangement of my novel device, and all of the above and other features and objects of the invention, details of construction, combinations of parts, and advantages, will be hereinafter more fully pointed out, described and claimed.

Referring to the drawing, illustrating preferred embodiments of my present invention, Fig. 1 is a side elevation illustrating the attachment of my novel device to the plural driving wheels of a motor vehicle;

Figure 1:
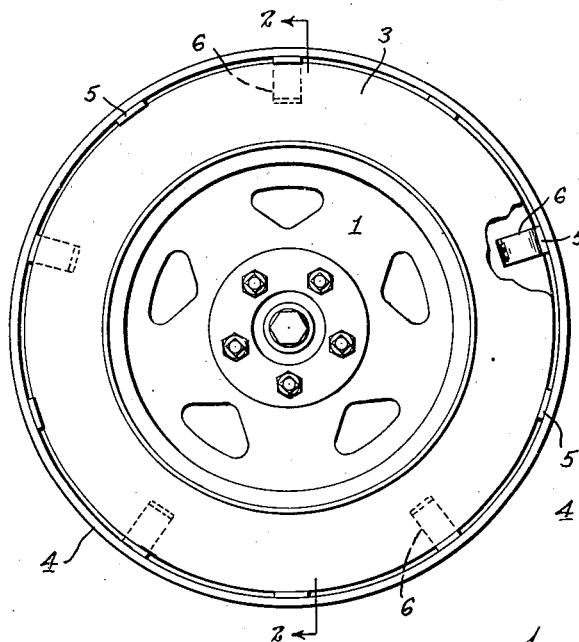

Referring now to the drawing, for a particular description of the invention, its construction and operation, the usual and customary trucks utilized in road maintenance work are provided with dual or plural rear or driving wheels, here illustrated generally at 1, mounted on the axle 2. Pneumatic tires 3 are usually utilized, the spacing and relation of these tires being clearly illustrated in Fig. 2.

Figure 2:
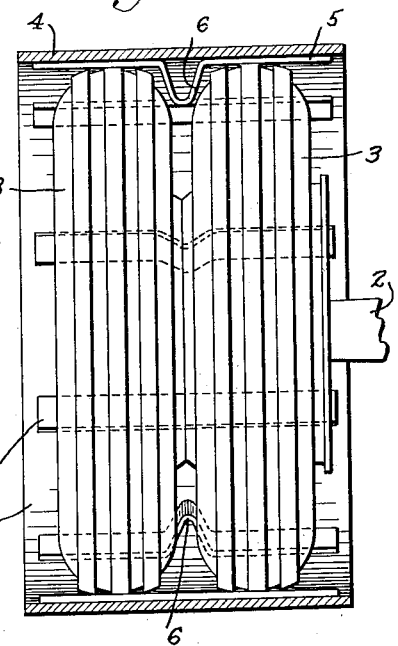
Fig. 2 is a vertical sectional view on the line 2—2 of Fig. 1.

My novel road rolling device comprises an annulus or cylinder 4, of suitable gauge, strength and metal for the purpose intended, the same being formed either in one piece, which is preferred, or, if desired, being composed of any suitable or desired number of separate sections relatively arranged and connected together in any suitable manner. The internal diameter of this annulus is appropriately less than the normal inflated diameter of the tires 3, or, as illustrated in Figs. 1 and 2, cleats 5 may be fixed to the interior of said annulus, and in this event, the diameter of a circle defined by the inner surfaces of these cleats is appropriately less than the normal inflated diameter of said tires so that when the tires 3 are deflated and the annulus is applied to the tires and the tires subsequently are inflated their resulting expansion under the normal or approximately normal air pressure introduced into them results in their tread portions being spread or flattened under considerable pressure either directly against the inner face of the annulus, or against the inner faces of the cleats 5 as the case may be. Thereby the annulus is so firmly gripped by the tires as to be required under all operating conditions to rotate with the wheels as is obvious.

Means is provided to prevent lateral displacement of the annulus from the tires, this means being here illustrated as projections formed on certain of the cleats 5, although it will be appreciated that this is for illustrative purposes only, and that any type or shape of lug or the like may be utilized, the only requirement thereof being, as aforesaid, to prevent lateral displacement of the annulus 4.

The method of applying the device illustrated in Figs. 1 and 2 is simple, being briefly described as follows:

It being desired to compress and smooth a surface, such as a patch in a roadway, the truck is jacked up until the wheels to receive the roller are spaced from the surface of the ground. The outer tire, or the wheel with the tire thereon then is removed and both tires are suitably deflated. The annulus 4 then is slid over said inner tire. Thereupon the outer tire or wheel is replaced and secured in position. The projections or lugs 6 then are disposed in the position illustrated in the drawing, between the tires 3. Said tires are then inflated to normal pressure and thereby are expanded under considerable pressure against the inner surface of the annulus, or against the cleats 5 if they are used, and the device consequently is firmly gripped by the tires. The lugs 6 are not essential. On the contrary, they are provided primarily as safety devices to hold the annulus on the wheels in the event of puncture of a tire.

If desired, these rollers can be applied to the rear wheels at both sides of the vehicle, as for example when rolling a wide patch or piece of road.

My novel device presents many advantages over the usual road rollers. Due to the resilience of the pneumatic tires, when the roller is leaving or is moving onto a patch to be compressed and smoothed, there is no jolt or drop, such as is occasioned by the usual roller, and there is thus no break between the normal road surface and the surface of the patch, an advantage which will be instantly apparent to those skilled in this art. Furthermore, starting torque is resiliently absorbed by the tires and sudden damaging strains on the vehicle axle and power transmission mechanism are correspondingly reduced.

My novel rollers may also be utilized in rolling other surfaces than roads, such for example as golf greens, or in fact, any surface which is to be compressed, smoothed or rolled.

It will be understood and appreciated that the compressive action of said rollers on the surface being operated upon may be varied at will by the operator, by simply shifting or varying the load carried by the truck to increase or decrease the compression. After completion of a surfacing job, the rollers may be left on the wheels of the vehicle and will not retard or interfere with the travel of said vehicle to the next job or series of jobs.

If desired, the outer surface of my novel device may be provided with means, such as protruding spikes, or the like, for breaking up a surface to be repaired, this being usual and customary, and any desired means may be employed to this end.

Figure 3:
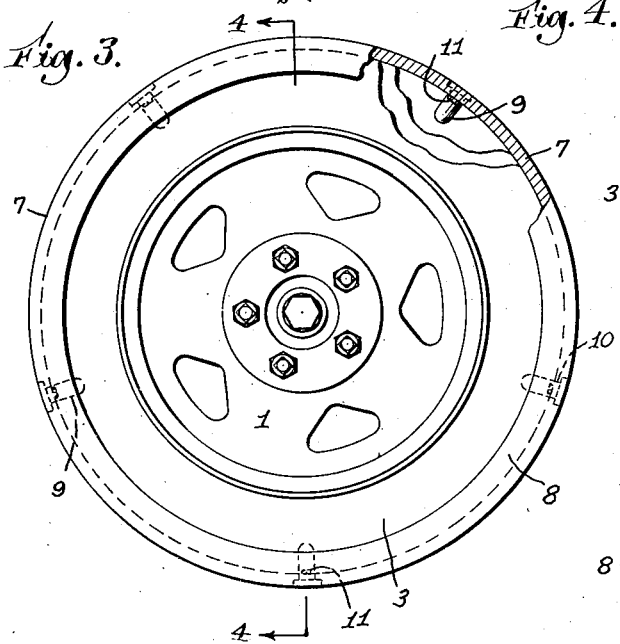
Fig. 3 is a side elevation illustrating a slightly modified structure.
Figure 4:
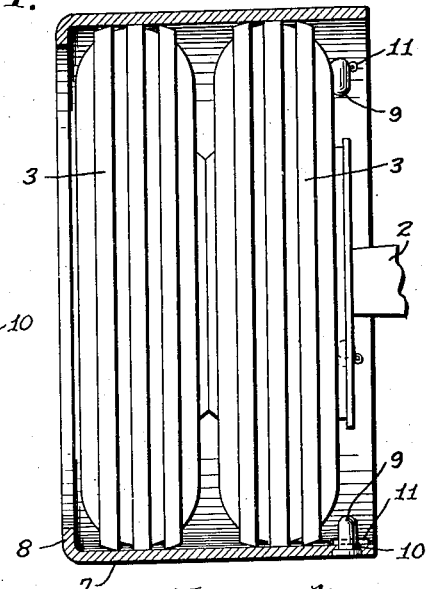
Fig. 4 is a vertical sectional view on the line 4—4 of Fig. 3.

In Figs. 3 and 4 I have illustrated a slight modification, wherein the annulus 7 is provided with a flange 8 projecting inwardly around its outer edge. When applying this form of the invention, the tires 3 are slightly deflated, the truck jacked up, and the annulus 7 slid over the tires. When in position over the tires 3, pins 9 are slid through the apertures 10 adjacent to the inner edge of the annulus 7, and secured in place by cotter pins 11 or the like.

In this form of the invention the lugs or projections 6 are not essential, the flange 8 and pins 9 constituting means to prevent lateral displacement of the roller annulus. Also the cleats 5 may, or may not be utilized, as desired. Regarding the cleats 5 it is pointed out that while, in effect, they sink into the tread surfaces of the tires when the latter are inflated and thus act substantially positively to require rotation of the annulus with the wheels, they are provided primarily to facilitate application and removal of the annulus to and from the tires. In other words, in the absence of said cleats or their equivalents, the inner face of the annulus during application or removal thereof is likely to contact with the tires continuously along an appreciable circumferential extent of the annulus and the consequent friction may be difficult to overcome, whereas, by reason of the circumferentially spaced cleats, the area of contact and consequently the friction between the annulus and the tires is so reduced that the annulus may be slid onto and off of the tires with comparatively little effort, especially if the cleats are greased.

My novel roller may be applied to tires of varying sizes by utilizing fillers in the nature of the cleats 5, if desired, to occupy the space between the outer diameter of the tires and the inner diameter of the roller.

It will also be appreciated and understood that my invention is applicable to single tired wheels, with equal facility and beneficial results.

The simplicity, economy, efficiency, and many advantageous features of my road roller attachment will be instantly apparent to those skilled in this art, and since I believe that said attachment is novel, I have claimed the same broadly in this application.

While I have necessarily described my present invention somewhat in detail, it will be appreciated that I may vary the size, shape and arrangement of parts within reasonably wide limits without departing from the spirit of the invention.

My invention is further described and defined in the form of claims as follows:

1. In combination with a vehicle wheel having a pneumatic tire, a road rolling attachment for mounting over the tire comprising an annulus of such less internal diameter than the normal inflated diameter of said tire that when the tire is inflated within the annulus the tread portion of the tire is flattened out against inside surface portions of the annulus to firmly grip the same.

2. In combination with a vehicle wheel having a pneumatic tire, a road rolling attachment for mounting over the tire comprising an annulus of such less internal diameter than the normal inflated diameter of said tire that when the tire is inflated within the annulus the tread portion of the tire is flattened out against inside surface portions of the annulus to firmly grip the same, the inside surface portions of the annulus with which the tire engages being straight in a direction longitudinally of the annulus.

3. In combination with a vehicle wheel of the type having dual pneumatic tires, a road rolling attachment mounted over the tires, comprising an annulus, and means carried by said annulus and interposed between the said tires to prevent lateral displacement of said annulus from said tires.

4. In combination with a vehicle wheel of the type having dual pneumatic tires, a road rolling attachment for mounting over the tires of a plural tire wheel, comprising an annulus of such less internal diameter than the normal inflated diameter of said tires that when the tires are inflated within the annulus the tread portions of the tires are pressed with considerable force against inside surface portions of the annulus to firmly grip the same, and means carried by said annulus and interposed between the said tires to prevent lateral displacement of said annulus from said tires.

5. A road rolling attachment for mounting over the tires of a plural tire wheel, comprising an annulus, a plurality of circumferentially spaced cleats fixed to and projecting inwardly beyond the inner face of said annulus, the diameter of a circle around the inner surfaces of said cleats being less than the normal inflated diameter of said tires, and means carried by said annulus and interposed between said tires to prevent lateral displacement of said annulus from said tires.

6. A rolling attachment for mounting over the tire of a motor vehicle, comprising an annnulus having an inturned flange around its outer edge to limit inward movement of the annulus upon the tire, and retractible means projecting into said annulus adjacent to its inner edge for engagement with the inner side of the tire to prevent outward displacement of said annulus from said tire.

7. In combination with a vehicle wheel of the type having dual pneumatic tires, a road rolling attachment therefor comprising an annulus of such less internal diameter than the normal inflated diameter of the tires, that when the tires are inflated within the annulus the tread portions of the tires are flattened out against inside surface portions of the annulus to firmly grip the same.

8. A road rolling attachment for a vehicle wheel of the type having dual pneumatic tires comprising an annulus to be engaged over the tires, and circumferentially spaced cleats carried by said annulus and projecting inwardly beyond the inner face thereof, the diameter of a circle to which the inner faces of the cleats are disposed tangentially being less than the normal inflated diameter of the tire, said cleats having formations for disposition between the tires to prevent lateral displacement of the annulus from the tires.

9. A road rolling attachment for a vehicle wheel having a pneumatic tire comprising an annulus to be engaged over the tire, and circumferentially spaced cleats carried by the annulus and projecting inwardly beyond the inner face thereof, the diameter of a circle to which the inner faces of the cleats are disposed tangentially being less than the normal inflated diameter of the tire.

10. A road rolling attachment as set forth in claim 9 in which the inside surface portions of the cleats with which the tire engages are straight in a direction longitudinally of the annulus.

JAMES E. LAWRENCE.